(12) United States Patent
Zhang et al.

(10) Patent No.: US 8,068,562 B1
(45) Date of Patent: Nov. 29, 2011

(54) SIGNAL PROCESSING FOR MULTIPLE CHAINS INCLUDING BARKER CODE CORRELATION AND AUTO-CORRELATION

(75) Inventors: Ning Zhang, Santa Clara, CA (US); Alan Jauh, Santa Clara, CA (US); Bianca Chen, Santa Clara, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 732 days.

(21) Appl. No.: 11/927,574

(22) Filed: Oct. 29, 2007

(51) Int. Cl.
*H04L 27/14* (2006.01)
*H04L 27/22* (2006.01)
(52) U.S. Cl. ............... 375/324; 375/320; 375/323
(58) Field of Classification Search .............. 375/316, 375/150, 130
See application file for complete search history.

(56) References Cited

U.S. PATENT DOCUMENTS 5,960,028 A * 9/1999 Okamoto et al. ............ 375/130
7,684,473 B2 * 3/2010 Walton et al. ................ 375/150
2002/0031109 A1 * 3/2002 Maru ............................ 370/342
2003/0156603 A1 * 8/2003 Rakib et al. .................. 370/485
2004/0264607 A1 * 12/2004 Lewis .......................... 375/343
2006/0072498 A1 * 4/2006 Kent et al. .................... 370/328
2007/0230403 A1 * 10/2007 Douglas et al. .............. 370/334

* cited by examiner

*Primary Examiner* — Khanh C Tran
*Assistant Examiner* — Qutbuddin Ghulamali
(74) *Attorney, Agent, or Firm* — Bever, Hoffman & Harms, LLP; Jeanette S. Harms

(57) ABSTRACT

A method of processing a signal in a wireless network including multiple chains is provided. This method can include receiving the signal in a receiver and, for each chain, performing a Barker correlation on the signal to generate a Barker correlated signal. At this point, an autocorrelation can be performed on the Barker correlated signal to generate an autocorrelated signal. The autocorrelated signals from the multiple chains can be summed to generate a summed output. Additional processing, e.g. at least one of CCK weak signal detection, peak selection in a rake receiver, frequency estimation, and differential decoding, can then be performed based on the summed output.

16 Claims, 5 Drawing Sheets

SIGNAL PROCESSING FOR MULTIPLE CHAINS INCLUDING BARKER CODE CORRELATION AND AUTO-CORRELATION

BACKGROUND OF THE INVENTION

1. Field of the Invention

The present invention relates to signal processing in a wireless communication network and particularly to signal processing in this network when multiple chains are used.

2. Related Art

In accordance with the guidelines promulgated in IEEE 802.11b, a packet can include a preamble followed by a header. All 802.11b-compliant systems support a long preamble, which includes 128 bits for a synchronization (Sync) field and 16 bits for a start frame delimiter (SFD) field. A short preamble, which includes 56 bits for the Sync field and 16 bits for the SFD field, is provided to improve throughput when data such as voice, VOIP, or streaming video is being transmitted.

Before transmission, the preamble (whether long or short) is spread using a Barker code that has eleven "chips", i.e. 10110111000. Note that after the preamble, other parts of the packet can be spread using a Barker code or a CCK code, depending on the data rate used for transmission.

Upon receiving a signal, a receiver can use cross-correlation to try and match the Barker code with the received signal. Notably, a Barker code has certain mathematical qualities that can help the receiver detect the packet and determine the boundaries of each symbol, thereby providing synchronization. After synchronization, the receiver can begin further processing of the packet, e.g. decoding and other processing.

Typically in decoding, a rake receiver can be used to counter the adverse effects of multipath. That is, in wireless communication, radio signals can reach a receiver's antenna by multiple paths (created because of, for example, reflection off of physical objects). Referring to FIG. 1, because each signal travels at the speed of light but travels by a different path to the receiver's antenna, a receiver can receive the multipath signals 101 as energy pulses over a period of time.

A rake receiver typically includes a plurality of sub-receivers (called fingers herein), wherein each finger has a small delay that allows tuning to an individual multipath component. FIG. 2 illustrates an exemplary finger 201 that collects symbol energy for a rake receiver 200. In this embodiment, a matching block 207 can receive an input RF signal and assign each finger of rake receiver 200 an energy "peak". The assigned peak can be provided to a Barker correlator 202, a delay equalizer 204, and code generators 205. Barker correlator 202, with additional input from code generators 205 (which generate the code for identifying symbols at the assigned energy) and the received RF signal, can provide de-spreading of the received RF signal for both I and Q branches. A phase rotator 203 can receive outputs of Barker correlator 202 and a channel estimator 206 (which also receives outputs of correlator 202) to estimate the phase-corrected state of the received RF signal channel. Delay equalizer 204, which also receives the outputs of phase rotator 203, can determine the appropriate compensation of the delay for the difference in arrival times of the symbols in finger 201. This output can then be provided to combiner 208, which receives outputs from other fingers (which can include identical function blocks to finger 201 and therefore are shown merely as additional arrows pointing to combiner 208).

Thus, as noted in FIG. 2, although each multipath component can be decoded independently, the rake receiver subsequently combines the multipath components in combiner 208. Notably, in a multipath environment, a direct signal is not necessarily the best signal. Thus, by combining the multipath components, an optimized signal can be obtained, thereby improving receiver performance.

In one embodiment called an equal-gain combining, the rake receiver outputs can be combined by weighting each output equally. In another embodiment called maximal ratio combining (MRC), each output is weighted to maximize the signal-to-noise ratio (SNR) of the combined output.

As proposed, IEEE 802.11n is a standard directed to handling multiple chains (facilitated by MIMO, i.e. multiple-input multiple-output), in contrast to the single chain described above in accordance with 802.11b. An existing technique for handling multiple chains is to use switch diversity, e.g. determine which chain provides the highest SNR and selecting the signals from that chain for decoding. However, combining signals from all chains could provide better receiver performance. Therefore, a need arises for improving the processing of signals in the context of IEEE 802.11n, i.e. wherein the wireless network includes multiple chains.

SUMMARY OF THE INVENTION

A method of processing a signal in a wireless network including multiple chains is provided. This method can include receiving the signal in a receiver and, for each chain, performing a Barker correlation on the signal to generate a Barker correlated signal. At this point, an autocorrelation can be performed on the Barker correlated signal to generate an autocorrelated signal. The autocorrelated signals from the multiple chains can be summed to generate a summed output. Additional processing, e.g. at least one of CCK weak signal detection, peak selection in a rake receiver, frequency estimation, and differential decoding, can then be performed based on the summed output.

In one embodiment, for each chain, a maximal ratio combining (MRC) buffering can be performed to generate a buffered signal. Therefore, the above-described Barker correlation can be performed on the buffered signal. In one embodiment, the gain of each channel in the MRC buffering can be made proportional to a root-mean-square (RMS) signal level and inversely proportional to a mean square noise level in that channel. In this manner, a different proportionality constant can be provided for each chain.

For CCK weak signal detection, the method can further include applying a window sum with a predetermined length to the summed output to derive a window value. Decision flags based on the window value can then be generated. Accumulated values based on the decision flags can be generated. A decision index based on the accumulated values can be generated. This decision index can indicate whether a CCK weak signal is detected.

In peak selection in a rake receiver, the power of the summed output can be determined. The power and a time-delayed version of the power can be summed to generate a power sum. Two adjacent power sum signals can be summed over time to determine a peak index selection. A window sum with a predetermined length can be performed using the power sum and the peak index selection to generate a center index signal. The center index signal can be used for channel estimation.

In frequency estimation, summed outputs collected from peaks of the multiple chains can be squared to generate a squared output signal. Two adjacent T/2 spaced squared output signals can be summed to generate a signal-to-noise-ratio (SNR) improved signal. The SNR improved signals can be summed over symbols and chains to generate a modified signal. The modified signal can be used for frequency offset correction.

In differential decoding, two adjacent T/2 spaced summed output signals can be summed to generate a signal-to-noise-ratio (SNR) improved signal. The SNR improved signals can be summed over chains to generate a modified signal. The modified signal can be used for differential decoding.

DETAILED DESCRIPTION OF THE FIGURES

When multiple chains are used for IEEE 802.11n, it is desirable to combine the signals from all chains for signal processing. This combination can provide signal diversity, which can increase the SNR and improve interference immunity. Thus, combining signals from the chains can advantageously improve receiver performance. For example, the potential MRC (maximal ratio combining) gain is 10*log 10(N), where N is the number of receive chains.

Similarly to IEEE 802.11b, the 802.11n preamble can use the 11-chip Barker code to spread the signal. The known Barker code can be used to correlate with the received signal on each chain. As described below, autocorrelation can then be applied to each Barker correlated output. The autocorrelations from all chains can be summed together. This sum can then be provided to subsequent processing blocks.

Inclusion of Autocorrelation for Signal Processing

Figure 1:
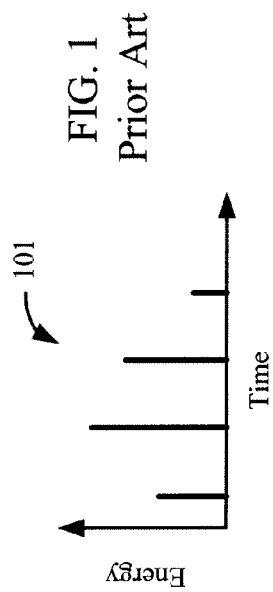
FIG. 1 illustrates simplified, time-diversified multipath signals.
Figure 2:
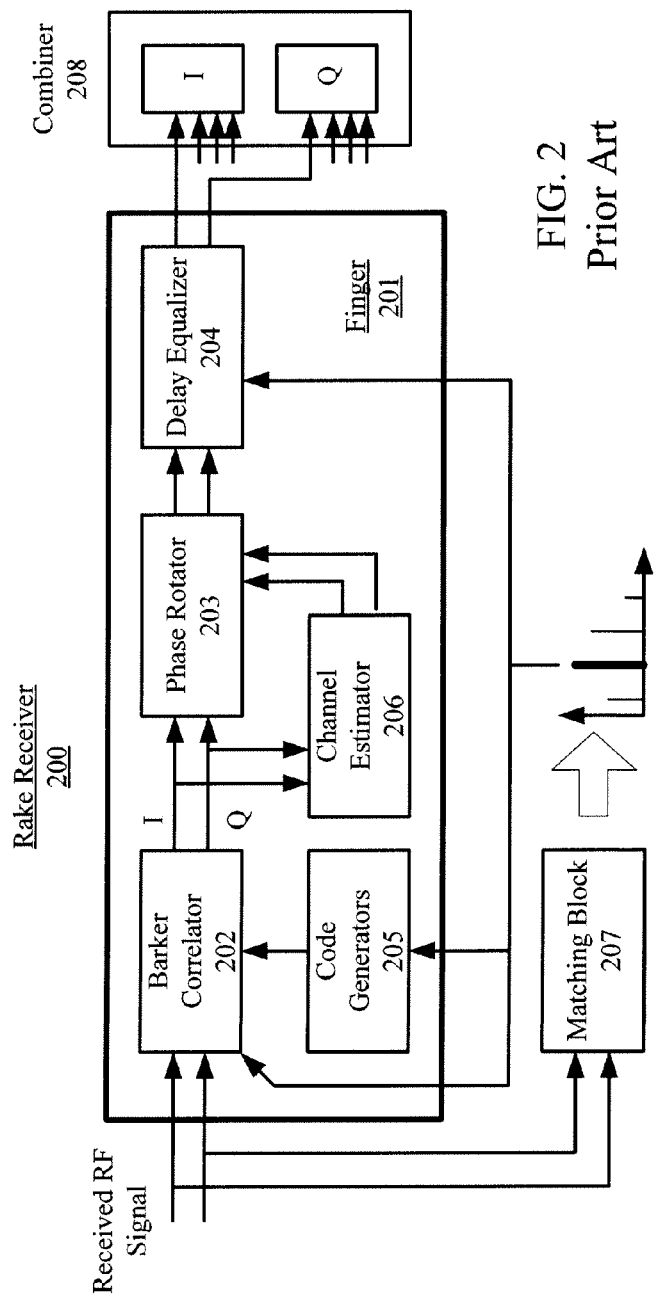
FIG. 2 illustrates a block diagram of an exemplary finger of a rake receiver.
Figure 3:
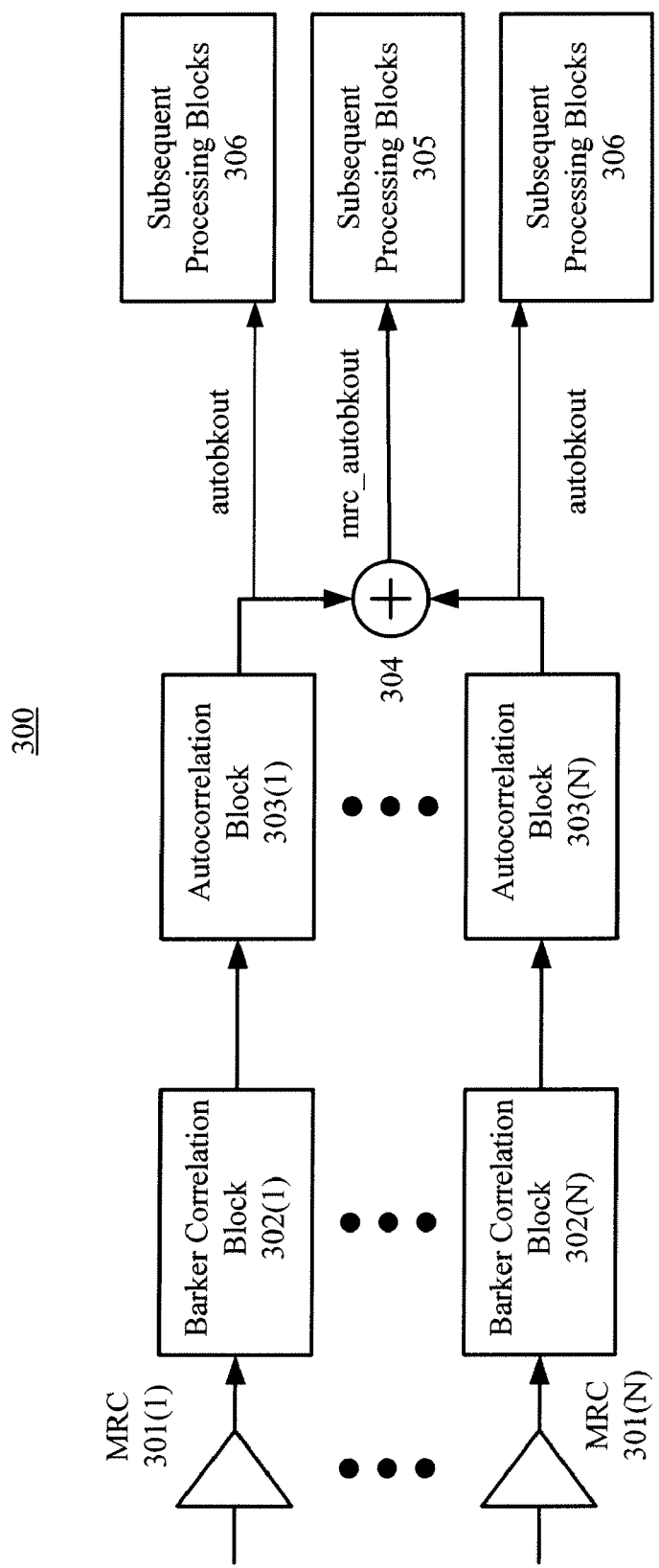
FIG. 3 illustrates part of an IEEE 802.11n receiver that can use both Barker correlation and autocorrelation for signal processing.

FIG. 3 illustrates part of an IEEE 802.11n receiver 300 that can use both Barker correlation and autocorrelation for signal processing. Receiver 300 can include a plurality (N) of receive chains (where N is a predetermined integer) for receiving input signals. In this embodiment, each receive chain can include a maximal ratio combining (MRC) buffer 301 that combines the signals from each channel for each receive chain. In one embodiment, the gain of each channel is made proportional to a root-mean-square (RMS) signal level and inversely proportional to the mean square noise level in that channel. Therefore, each receive chain can be provided, as a result, a different proportionality constant.

Each receive chain can further include a Barker correlation block 302 that receives an output from MRC buffer 301 (note that in other embodiments, MRC buffer 301 is optional). Notably, autocorrelation can be performed on each Barker correlated (de-spread) signal in a chain before further signal processing. Specifically, for each receive chain, an autocorrelation block 303 can receive the de-spread signals from Barker correlation block 302. Auto-correlation block 303 can multiply the output of Barker correlation block 302 with the conjugate of its own delayed (e.g. 1 us) signal. Note that a larger product indicates greater signal strength, whereas a smaller product indicates lesser signal strength.

An adder 304 can be used to sum the outputs of autocorrelation blocks 302(1)-303(N). Then, adder 304 can provide its summed output mrc_autobkout to subsequent processing blocks 305 that relate to CCK weak signal detection. The outputs of autocorrelation before summing, i.e. autobkout, can be provided to subsequent processing blocks 306 that can relate to peak selection in the rake receiver, frequency estimation, and differential decoding.

CCK Weak Signal Detection

Figure 4:
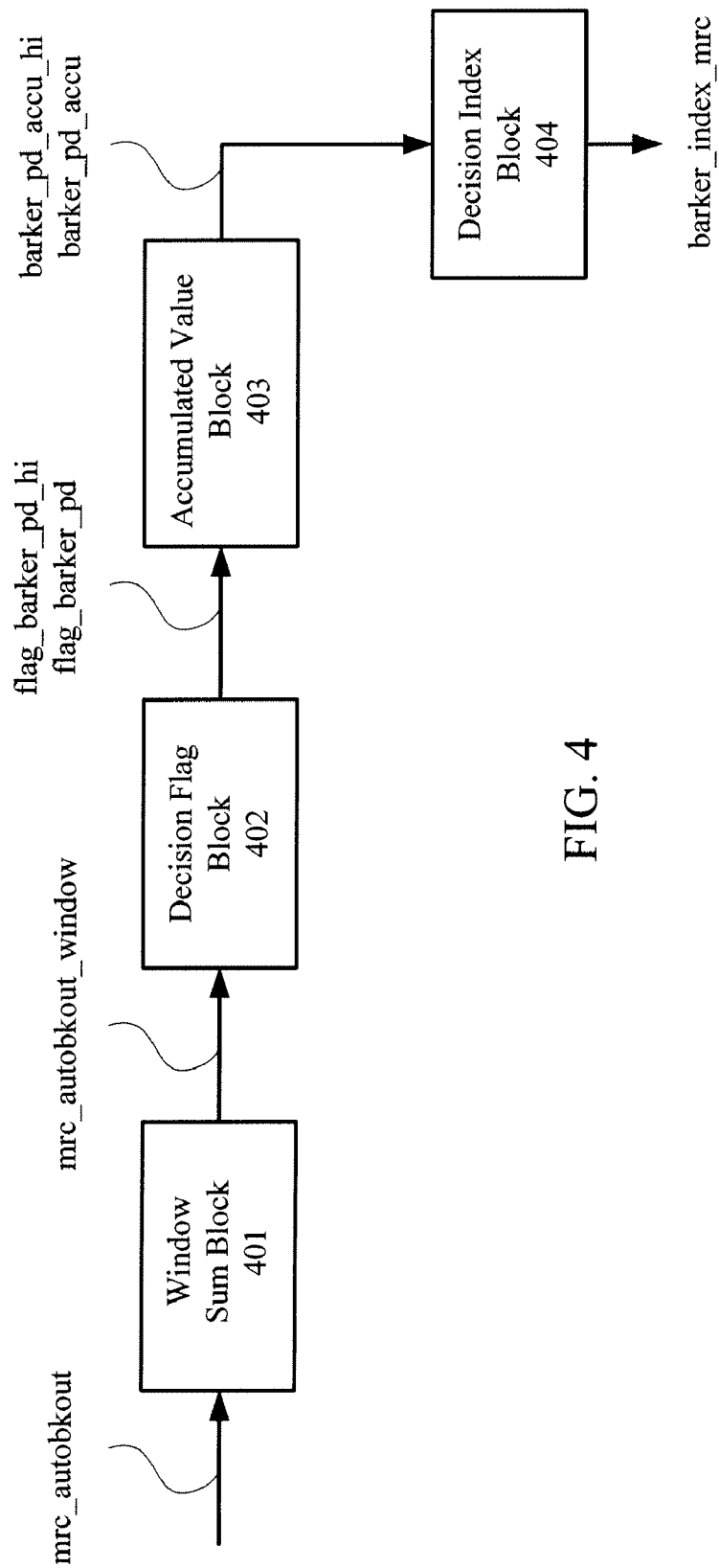
FIG. 4 illustrates exemplary processing blocks used for CCK weak signal detection.

FIG. 4 illustrates exemplary processing blocks used for CCK weak signal detection. In this processing, a window sum with predetermined length (e.g. 5) can be applied to the summed output mrc_autobkout to derive a window value mrc_autobkout_window in window sum block 401. At this point, decision flags can be generated by decision flag block 402. The decision logic for weak Barker signal detection for flag_barker_pd and flag_barkerpd_hi is:

flag_barker_pd=
(mrc_autobkout_real>mrc_bk_thd*mrc_power) AND barker_rssi_gt_thr flag_barker_pd_hi=
(mrc_autobkout_real>mrc_bk_thd_hi*mrc_power) AND barker_rssi_gt_thr wherein mrc_autobkout_real is the real part magnitude of mrc_autobkout_window, mrc_power is a power value that can be computed by summing the chip energies for all chains and then applying a window sum of predetermined length (e.g. 44), mrc_bk_thd is an empirically-derived threshold indicating a signal of low power, mrc_bk_thd_hi is an empirically-derived threshold indicating a signal of high power, and barker_rssi_gt_thr is an empirically-derived RSSI threshold for Barker-encoded signals.

In accumulated value block 403, accumulated values can be generated. For example, an accumulated value barker_pd_accu_hi(i) can be summed from flag_barker pd_hi, whereas an accumulated value barker_pd_accu(i) can be summed from flag_barker_pd. In decision index block 404, a decision index barker_index_mrc can be generated. In one embodiment, the barker_index_mrc can be set whenever (barker_pd_accu pass_num_low) OR (barker_pd_accum_hi pass_num_hi), wherein pass_num_low is a default value and pass_num_hi is another default value. Table 1 shown below indicates exemplary values for the above-described variables.

TABLE 1

Variables, Descriptors, & Exemplary Values

| Variables | Descriptors of Variables | Exemplary Values of Variables |
| --- | --- | --- |
| flag_barker_pd | Barker flag - standard | 0, 1 |
| flag_barker_pd_hi | Barker flag - high | 0, 1 |
| mrc_autobkout_real | MRC auto-correlation block output (real component) | $0, 2^{11}, -2^{-4}$ |
| mrc_bk_thd | MRC block - standard threshold | 18/16, 12/16, 10/16 |
| mrc_bk_thd_hi | MRC block - high threshold | 24/16, 19/16, 19/16 |
| mrc_power | MRC power | $0, 2^8, -2^{-7}$ |
| barker_rssi_gt_thr | Barker RSSI threshold | −5 |

TABLE 1-continued

Variables, Descriptors, & Exemplary Values

| Variables | Descriptors of Variables | Exemplary Values of Variables |
|---|---|---|
| mrc_autobkout_window | MRC auto-correlation block output window | 5 |
| barker_pd_accu_hi (i) | Barker accumulated - high | 1-5 |
| barker_pd_accu (i) | Barker accumulated - standard | 1-10 |
| barker_index_mrc | Barker MRC index | None or 500-1000 |
| pass_num_low | Passing low number | 8 |
| pass_num_high | Passing high number | 4 |

Peak Selection in the Rake Receiver

In one embodiment, a rake receiver can upsample the received signal by a factor of 2 (e.g. instead of 11 megasamples per second, the rake receiver samples 22 megasamples per second). Therefore, the resolution of the rake receiver can be up to 22 paths. However, in one embodiment, only a subset of those paths may be summed, wherein such paths in the subset can have larger peaks than other paths. For example, FIG. 5A illustrates an exemplary subset 501 of 9 larger peaks compared to 13 other peaks outside subset 501.

Figure 5A:
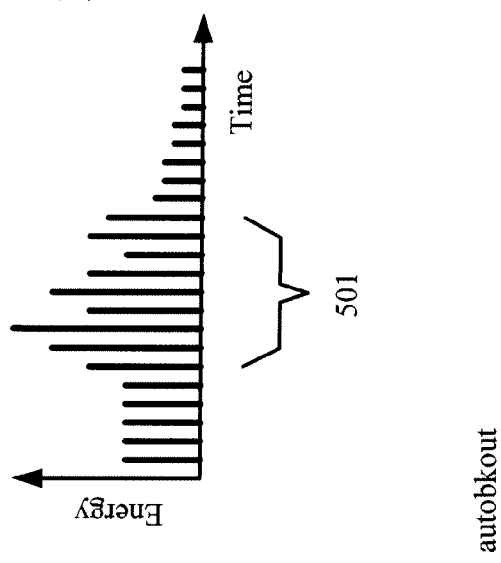
FIG. 5A illustrates a plurality of exemplary energy peaks that a rake receiver may receive over time.

Notably, the larger peaks typically occur within a window of time, as noted in FIG. 5A. Note that not all peaks within set 501 are larger than peaks outside set 501. However, subset 501 should include the largest peak as well as a majority of the larger peaks in the total possible set of 22 peaks. Note that although the peaks are shown as equally spaced, actual multipath signals typically have unequally-spaced peaks.

In one embodiment, the window including the subset could vary between chains. That is for each chain, a subset (and therefore its associated window) could be independently selected. In another embodiment, a window, indicated by its associated selected subset for one chain, could be applied to all other chains. This fixed window can advantageously simplify controls in the rake receiver while generally capturing most of the energy. In yet another embodiment, the initially indicated window could be used for all other chains with some predetermined amount of time shifting allowed to capture the most energy.

Figure 5B:
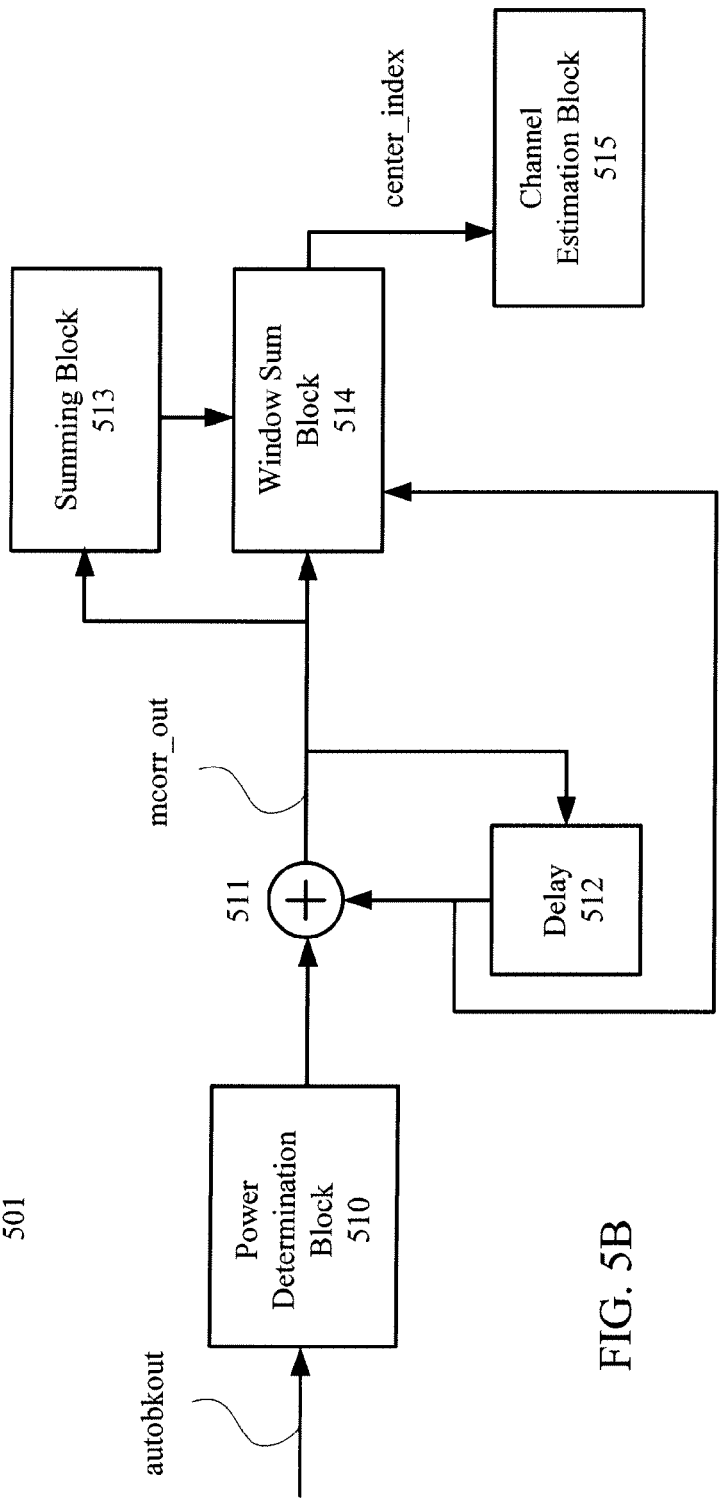
FIG. 5B illustrates exemplary processing blocks used for peak selection in a rake receiver.

FIG. 5B illustrates part of a rake receiver that can use the results of autocorrelation before summing, i.e. autobkout. In this embodiment, the power of autobkout, as determined by power determination block 510, can be provided to an adder 511. Adder 511 sums this power and a delayed power value, which is generated by delay block 512. In one embodiment, delay block 512 can be implemented by a one-tap filter where the delay time is 1 µs. Each finger of the rake receiver could include multiple (e.g. 22) one-tap filters.

The output of adder 511, mcorr_out can be provided to a summing block 513, which can sum two adjacent signals over time to determine peak index selection. Signal mcorr_out can also be provided to a window sum block 514, which can perform a window sum with a predetermined length (e.g. 9) and generate an output center_index based on the output of summing block 513. The signal center_index can be provided to subsequent processing blocks, e.g. channel estimation blocks 515.

Frequency Estimation and Differential Decoding

Figure 6:
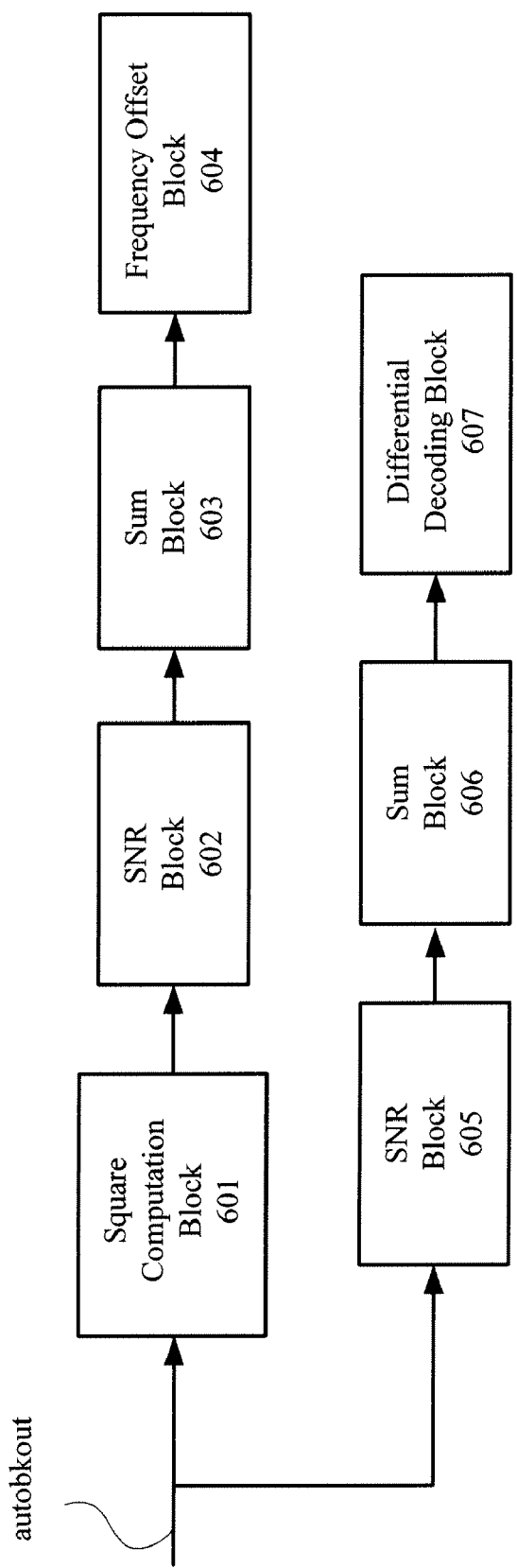
FIG. 6 illustrates part of a receiver that can use the results of autocorrelation for providing frequency estimation and differential decoding.

FIG. 6 illustrates part of a receiver that can use the results of autocorrelation before summing, i.e. autobkout, for providing frequency estimation and differential decoding. In this embodiment, the squared autocorrelation results collected from the peaks of each chain, as provided by square computation block 601, can then be provided to an SNR (signal to noise ratio) block 602. SNR block 602 sums two adjacent T/2 spaced signals to increase multipath SNR (wherein T is a regular period and T/2 is a twice over-sampled period). Sum block 603 then sums the outputs of SNR block 602 over symbols and chains. The output of sum block 603 can then be provided to a frequency offset block 604 for further signal processing.

As noted in FIG. 6, autobkout can also be provided to an SNR block 605. SNR block 605 sums two adjacent T/2 spaced signals to increase multipath SNR. Sum block 606 then sums the outputs of SNR block 605 over chains. The output of sum block 606 can then be provided to a differential decoding block 607 for re-modulation signal generation and/or long/short preamble decision making.

Although illustrative embodiments of the invention have been described in detail herein with reference to the accompanying figures, it is to be understood that the invention is not limited to those precise embodiment. They are not intended to be exhaustive or to limit the invention to the precise forms disclosed. As such, many modifications and variations will be apparent to practitioners skilled in this art. Accordingly, it is intended that the scope of the invention be defined by the following claims and their equivalents.

The invention claimed is:

1. A method of processing a signal in a wireless network including multiple chains, the method comprising:
   receiving the signal in a receiver;
   for each chain, performing a Barker correlation on the signal to generate a Barker correlated signal;
   for each chain, performing an autocorrelation on the Barker correlated signal to generate an autocorrelated signal;
   summing autocorrelated signals from the multiple chains to generate a summed output; and
   performing additional processing based on the summed output,
   wherein the additional processing includes CCK weak signal detection, the method further comprising:
   applying a window sum with a predetermined length to the summed output to derive a window value;
   generating decision flags based on the window value;
   generating accumulated values based on the decision flags; and
   generating a decision index based on the accumulated values, wherein the decision index indicates whether a CCK weak signal is detected.

2. The method of claim 1, further including for each chain, performing a maximal ratio combining (MRC) buffering to generate a buffered signal, wherein the Barker correlation is performed on the buffered signal.

3. The method of claim 2, wherein a gain of each channel in the MRC buffering is made proportional to a root-mean-square (RMS) signal level and inversely proportional to a mean square noise level in that channel, thereby providing a different proportionality constant for each chain.

4. The method of claim 1, wherein the additional processing further includes at least one of peak selection in a rake receiver, frequency estimation, and differential decoding.

5. The method of claim 4, wherein for peak selection in a rake receiver, the method further includes:
   determining a power of the summed output;
   summing the power and a time-delayed version of the power to generate a power sum;
   summing two adjacent power sum signals over time to determine peak index selection;

performing a window sum with a predetermined length using the power sum and the peak index selection to generate a center index signal.

6. The method of claim 5, wherein the center index signal is used for channel estimation.

7. The method of claim 4, wherein for frequency estimation, the method further includes:
   squaring the summed output collected from peaks of the multiple chains to generate a squared output signal;
   summing two adjacent T/2 spaced squared output signals to generate a signal-to-noise-ratio (SNR) improved signal;
   summing SNR improved signals over symbols and chains to generate a modified signal; and
   using the modified signal for frequency offset correction.

8. The method of claim 4, wherein for differential decoding, the method further includes:
   summing two adjacent T/2 spaced summed output signals to generate a signal-to-noise-ratio (SNR) improved signal;
   summing SNR improved signals over chains to generate a modified signal; and
   using the modified signal for differential decoding.

9. A receiver in a wireless network including multiple chains, the receiver comprising:
   a Barker correlation block that performs a Barker correlation on a received signal for each chain;
   an autocorrelation block that performs an autocorrelation on an output of the Barker correlation block for each chain;
   an adder that sums outputs of the autocorrelation block from the multiple chains; and
   at least one processing block that uses an output of the adder to perform signal processing,
   wherein the at least one processing block includes a CCK weak signal detection block, which includes:
   a window sum block that applies a window sum with a predetermined length to the output of the adder;
   a decision flag block that generates decision flags based on an output of the window sum block;
   an accumulated value block that generates accumulated values based on an output of the decision flag block; and
   a decision index block that generates a decision index based on an output of the accumulated value block, wherein an output of the decision index block indicates whether a CCK weak signal is detected.

10. The receiver of claim 9, further including a maximal ratio combining (MRC) buffer for each chain, wherein an output of the MRC buffer is provided to the Barker correlation block.

11. The receiver of claim 10, wherein a gain of each channel in the MRC buffer is made proportional to a root-mean-square (RMS) signal level and inversely proportional to a mean square noise level in that channel, thereby providing a different proportionality constant for each chain.

12. The receiver of claim 9, wherein the at least one processing block further includes at least one of a peak selection block in a rake receiver, a frequency estimation block, and a differential decoding block.

13. The receiver of claim 12, wherein the peak selection block in the rake receiver includes:
   a power determination block that determines a power of the output of the adder;
   a second adder that sums the power and a time-delayed version of the power;
   a summing block that sums two adjacent signals over time to determine peak index selection;
   a window sum block that performs a window sum with a predetermined length using an output of the second adder and the peak index selection.

14. The receiver of claim 13, wherein an output of the window sum block is provided to a channel estimation block.

15. The receiver of claim 12, wherein the frequency estimation block includes:
   a square computation block that squares the output of the adder collected from peaks of the multiple chains;
   an SNR block that sums two adjacent T/2 spaced signals output by the square computation block;
   a sum block that sums signals output by the SNR block over symbols and chains; and
   a frequency offset block that uses an output of the sum block.

16. The receiver of claim 12, wherein the differential decoding block includes:
   an SNR block that sums two adjacent T/2 spaced signals output by the adder;
   a sum block that sums signals output by the SNR block over chains; and
   a differential decoding block that uses signals output by the sum block.

* * * * *